May 3, 1932.  W. F. RUDOLPH ET AL  1,856,432
CAMERA FOCUSING SYSTEM
Filed Nov. 19, 1929  6 Sheets-Sheet 1

Inventors
William F. Rudolph,
John Roy Hunt,
Harry G. Cunningham.

Attorney.

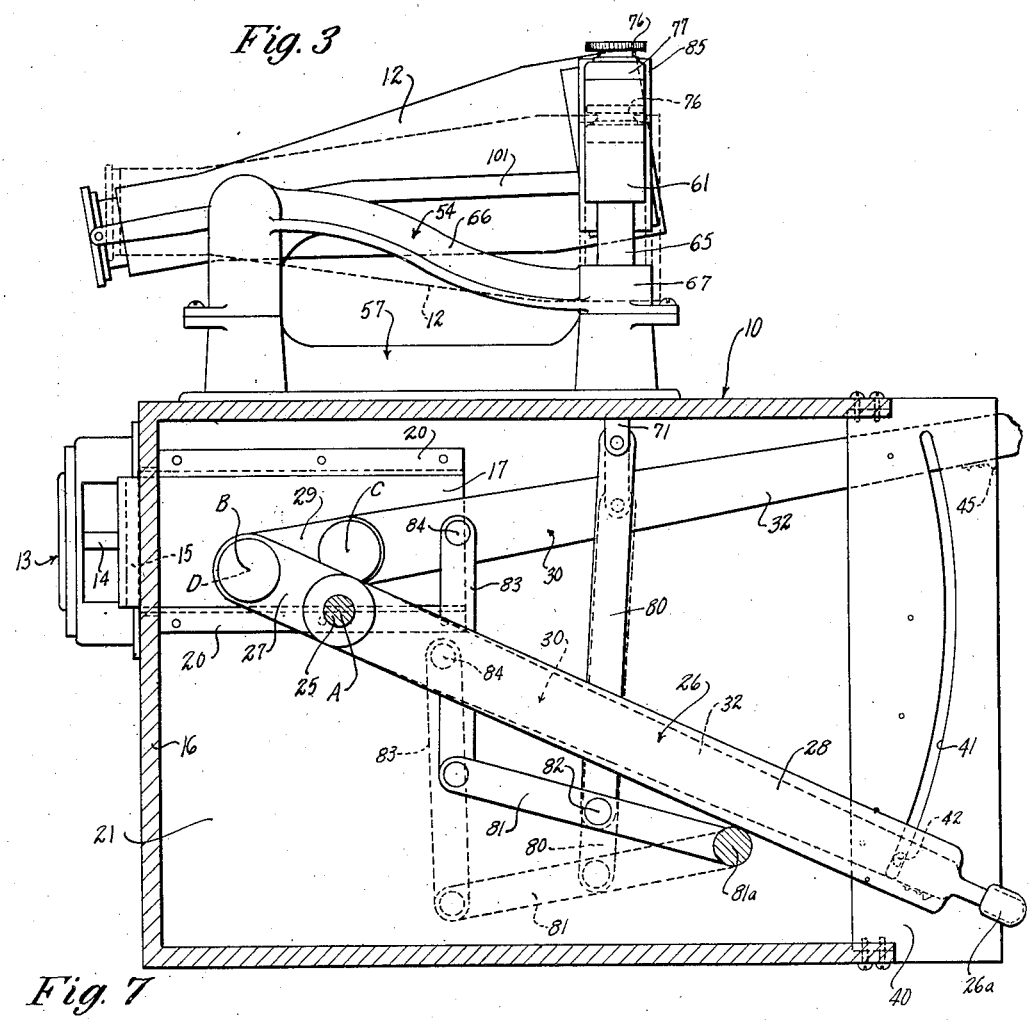
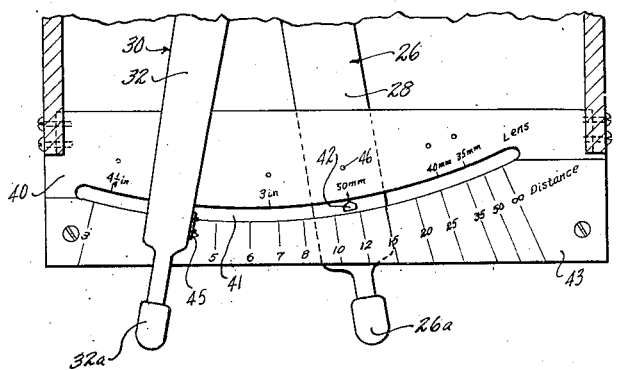

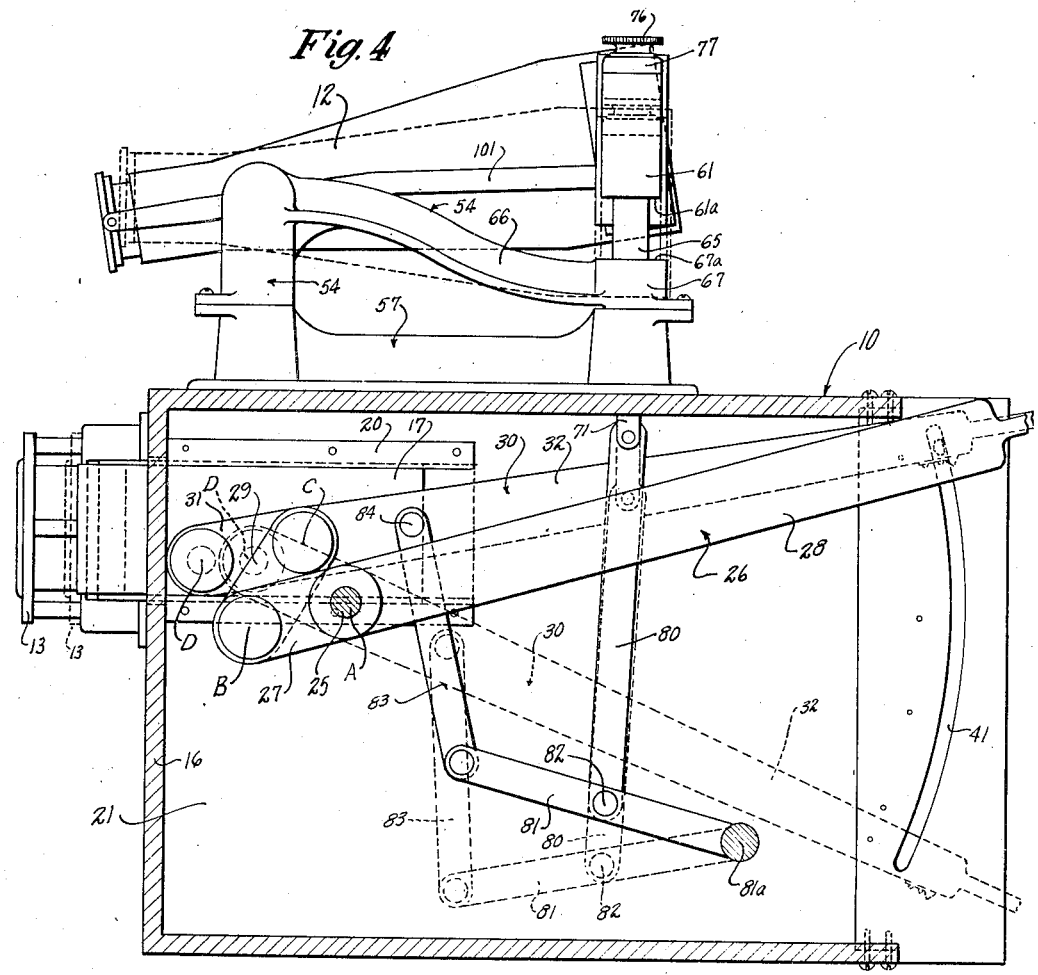
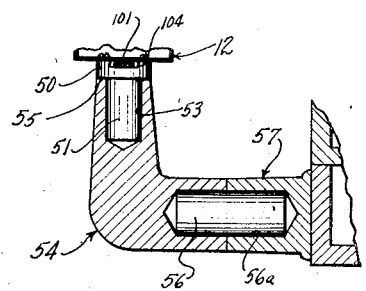

May 3, 1932.  W. F. RUDOLPH ET AL  1,856,432
CAMERA FOCUSING SYSTEM
Filed Nov. 19, 1929  6 Sheets-Sheet 4
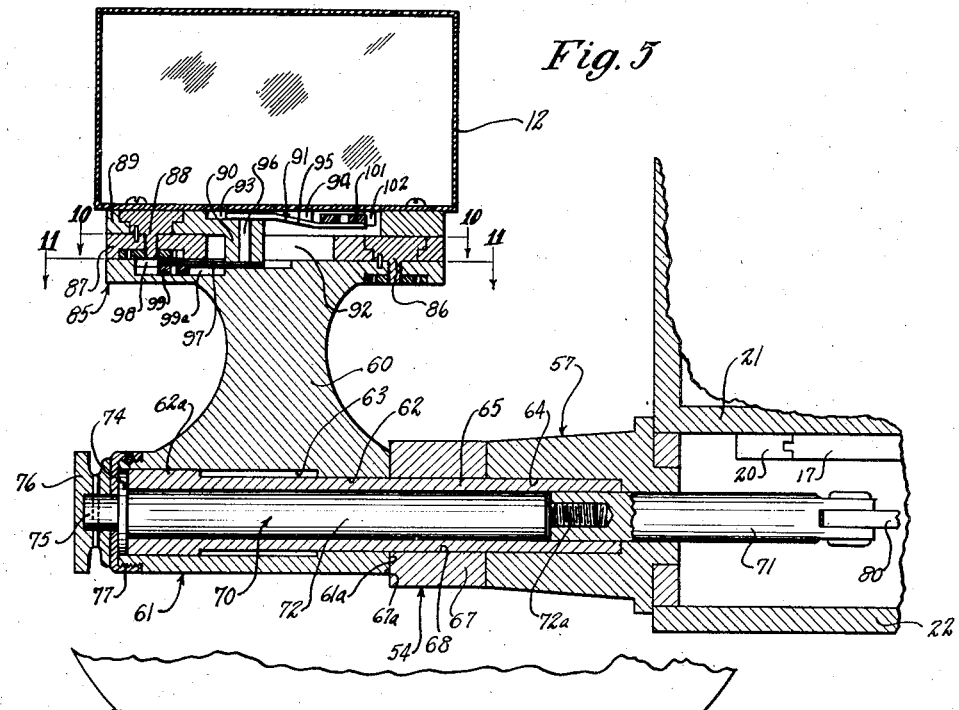
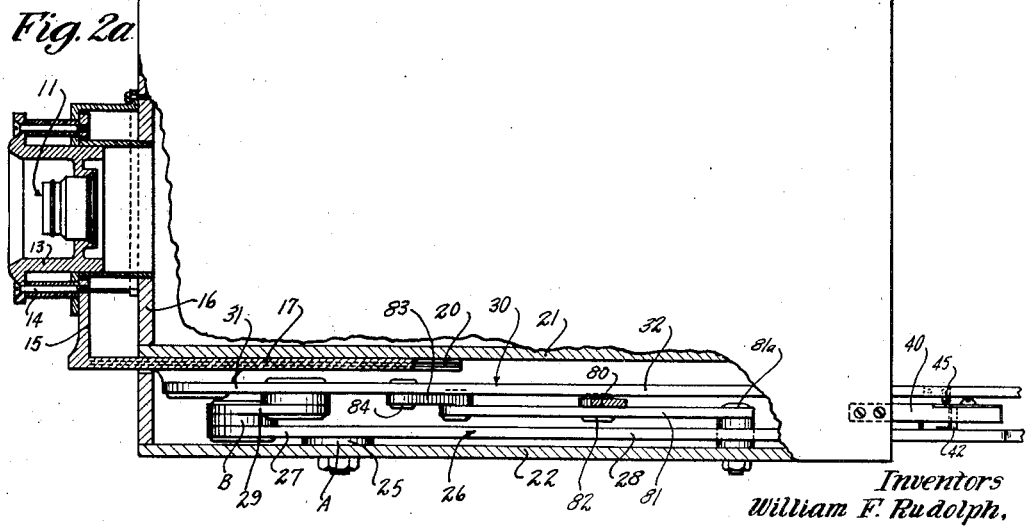
Inventors
William F. Rudolph,
John Roy Hunt,
Harry G. Cunningham.
Attorney.

May 3, 1932.  W. F. RUDOLPH ET AL  1,856,432
CAMERA FOCUSING SYSTEM
Filed Nov. 19, 1929   6 Sheets-Sheet 5
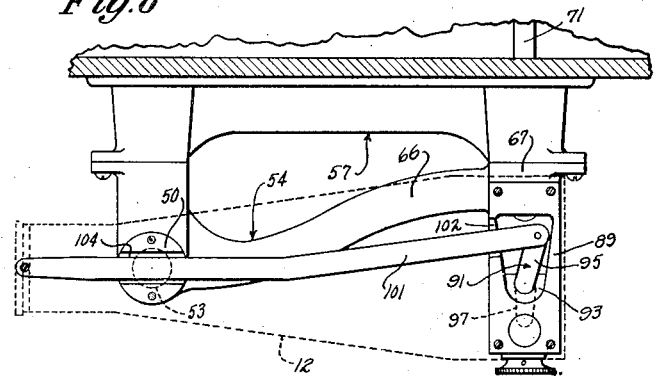
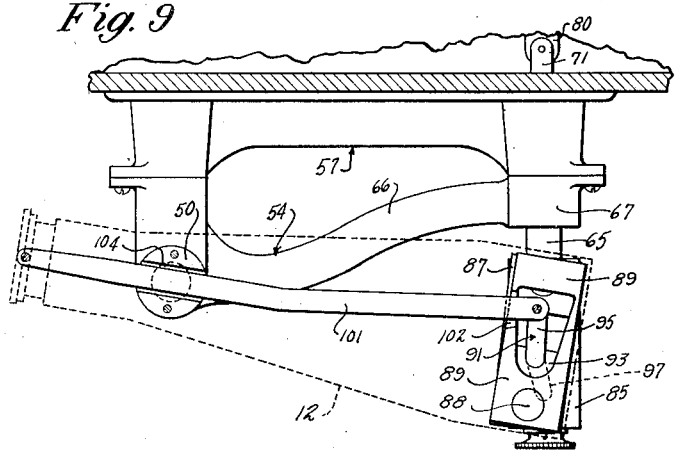
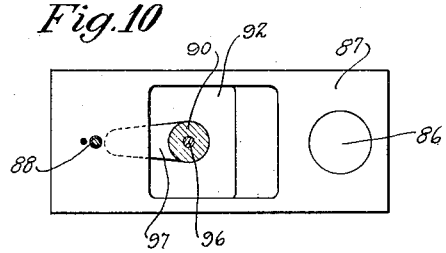
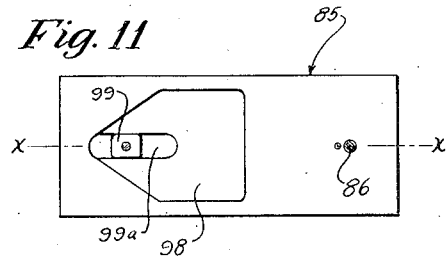
Inventors
William F. Rudolph,
John Roy Hunt,
Harry G. Cunningham.
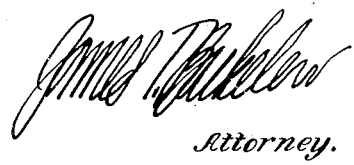
Attorney.

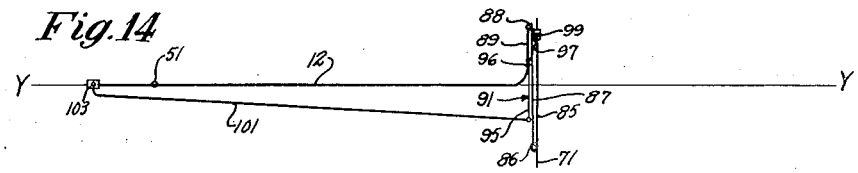
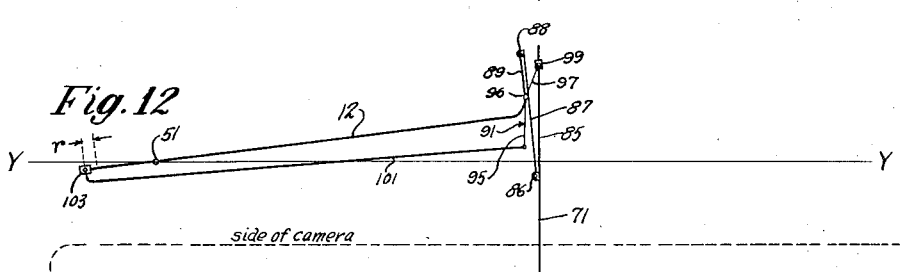
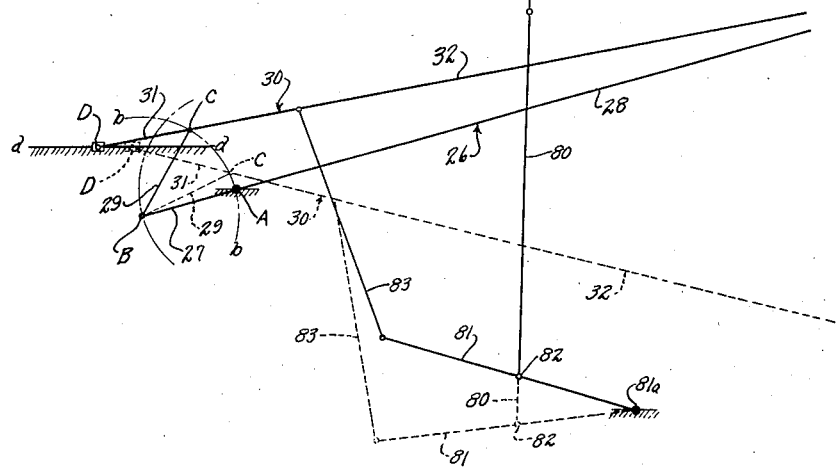
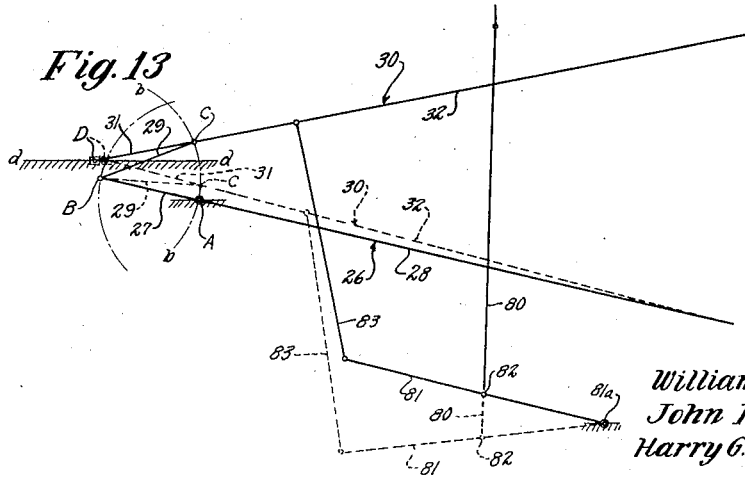

Patented May 3, 1932

1,856,432

UNITED STATES PATENT OFFICE

WILLIAM F. RUDOLPH, OF VAN NUYS, JOHN ROY HUNT, OF HOLLYWOOD, AND HARRY G. CUNNINGHAM, OF LOS ANGELES, CALIFORNIA, ASSIGNORS TO PARAMOUNT PUBLIX CORPORATION, OF LOS ANGELES, CALIFORNIA, A CORPORATION OF NEW YORK

CAMERA FOCUSING SYSTEM

Application filed November 19, 1929. Serial No. 408,266.

This invention is concerned with a focusing system for a camera, and while the invention is not limited thereto, it has particular utility as adapted to a motion picture camera and will therefore be hereinafter particularly described in that connection.

It is usual to provide a motion picture camera with a plurality of objective lenses of differing focal lengths for use in various situations, and it is well known that the distance a lens must be moved in focusing between close-up and infinity is determined by the focal length of that lens. Therefore each of the objective lenses has its own individual range of focusing movement, and these ranges vary in proportion to the focal length of the respective lenses. For lenses at one extreme of focal length this range of movement may be sufficiently great that, with the provision of a proper scale, a fair setting of the lens may be made; while at the other extreme of focal length the range of movement may be so small that the lens cannot be set with suitable accuracy.

The present invention in its first aspect, provides means whereby the objective lens of the camera may be shifted between the positions of "close-up" and "infinity" by a given definite movement of a focusing member for lenses of all focal lengths, and hence all ranges of lens movement. This fixed movement of the focusing member is made ample so that the greatest accuracy of setting is obtainable; and since the range of movement of the focusing member is the same for all lenses, the factor of accuracy likewise remains constant for all lenses.

For this purpose there is provided, in the present embodiment, a linkage system including two manually adjustable levers, one which may be termed a focus setting lever, and one which may be termed a lens compensating lever. The focus setting lever is linked to the lens for the purpose of moving the lens between the positions of "close-up" and "infinity", and is provided with a scale graduated in feet between these distances. The lens compensating lever is adapted to shift the linkage in such a way as to vary the ratio of movement of the focus setting lever to the movement of the camera lens controlled thereby. Thus, by means of this lens compensating lever the system may be set for a lens of any focal length so that full movement of the focus setting lever between the positions of "close-up" and "infinity" will effect the full range of focusing movement of the lens, no matter what that range may be. For instance, if a lens of relatively short focal length, say 35 mm., be in the camera, the lens compensating lever will be correspondingly set, and full movement of the focus setting lever will move the lens through its relatively small focusing range. When, on the other hand, a lens of relatively long focal length, say 4½", is in the camera, the lens compensating lever will be accordingly set and full movement of the focus setting lever will then move the lens through its relatively longer full focusing range. In other words, no matter how the full ranges of focusing movement of the various lenses may differ, the system may always be set for any given lens so that the fixed full movement of the focus setting lever will effect movement of that lens through its full focusing range.

The view finder of a motion picture camera must always be adjusted for parallax with every change of focus of the camera. This is ordinarily accomplished, for instance, by alining a cross hair in the photographic lens mounting of the camera with an object in the scene to be photographed, and then alining the viewing device by bringing its cross hair into alinement with the object previously alined with the cross hair of the photographic lens mounting. This manual operation involves much loss of time and is greatly inconvenient at best.

It is an object of the present invention to provide means for automatically adjusting the view finder for parallax when the objective lens of the camera is focused upon an object.

This object is accomplished according to the present invention by linking the viewing device to the aforementioned focusing-system linkage in such a manner that when the objective lens of the camera is focused upon an object, the view finder is automatically adjusted for parallax, no matter what focal length lens there may be in the camera, and therefore what the compensating setting of the linkage may be. To accomplish this result the view finder is operatively connected with a selected member of said linkage which has a constant motion for all settings of the linkage, so that the view finder is always adjusted for parallax by the operation of focusing the photographic lens irrespective of the focal length of that lens and hence of the compensating adjustment of the linkage.

As a further improvement, the objective lens of the viewing device is also linked to the focusing-system linkage in such a fashion that the lens of the viewing device is automatically focused by the operation of focusing the objective lens of the camera, the arrangement being such that this adjustment also is made irrespective of the focal length of the camera lens, and hence of the compensating setting of the linkage.

The specific nature and advantageous features of our invention will be fully understood from the following detailed description of a present preferred embodiment thereof, reference for this purpose being had to the accompanying drawings, in which:

Fig. 2a is a view similar to Fig. 2, but showing the parts in another operative position;

Fig. 3 is a horizontal section taken on line 3—3 of Fig. 1 and showing the parts in one operative position;

Fig. 4 is a view similar to Fig. 3 but showing the parts in another operative position;

Fig. 5 is a vertical section taken on line 5—5 of Fig. 1;

Fig. 6 is a vertical section taken on line 6—6 of Fig. 1;

Fig. 7 is a fragmentary view taken on line 7—7 of Fig. 2;

Fig. 8 is a plan view of the view finder mounting parts, the overlying view finder being indicated in position in dotted lines;

Fig. 9 is a view similar to Fig. 8, but showing the parts in another operative position;

Fig. 10 is a horizontal section taken on line 10—10 of Fig. 5;

Fig. 11 is a horizontal section taken on line 11—11 of Fig. 5;

Fig. 12 is a diagram of the linkage system of the invention;

Fig. 13 is a view similar to Fig. 12 showing other positions of the linkage system; and Fig. 14 is a diagram showing parts of the linkage system.

Figure 1:
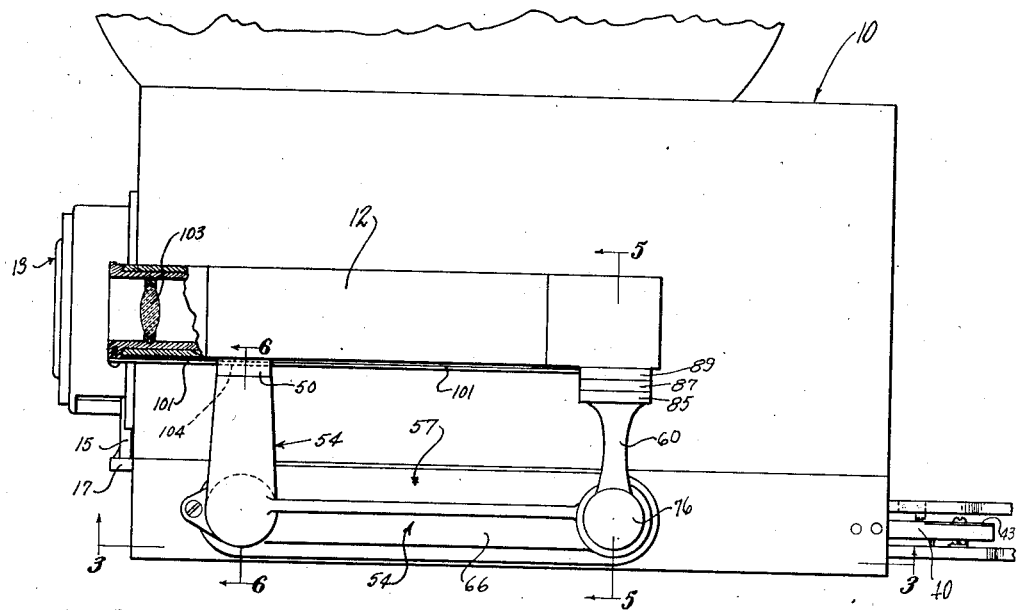
Fig. 1 is a side elevation of a motion picture camera to which our invention has been applied.

It is to be understood that although the following description is specific in nature to a single embodiment of the invention, that this description is but illustrative of the broad invention by way of setting out one specific manner in which it can be carried out in practice.

Referring now to the drawings, and particularly to Figs. 1 to 4, inclusive, the numeral 10 indicates a motion picture camera having an objective lens 11 and a view finder 12. Lens 11 is carried in a lens mounting 13, which is removably attached, as by screws 14, to a lens-carrier plate 15, which plate is movable between the position of Fig. 2, in which it is faced against the front wall 16 of the camera, and the position of Fig. 2a, in which it is removed therefrom, this range of movement being the focusing range of the objective lens. Carrier plate 15 is provided on and extends upwardly from a slider plate 17, which slides in the ways of guide strips 20 fixed to a partition 21 vertically spaced from the bottom wall 22 of the camera (see Figs. 2, 2a, 3 and 5).

The lens mount 13 may be removed from the camera for the purpose of changing lenses therein by taking out the screws 14 which secure it to carrier 15.

Figure 2:
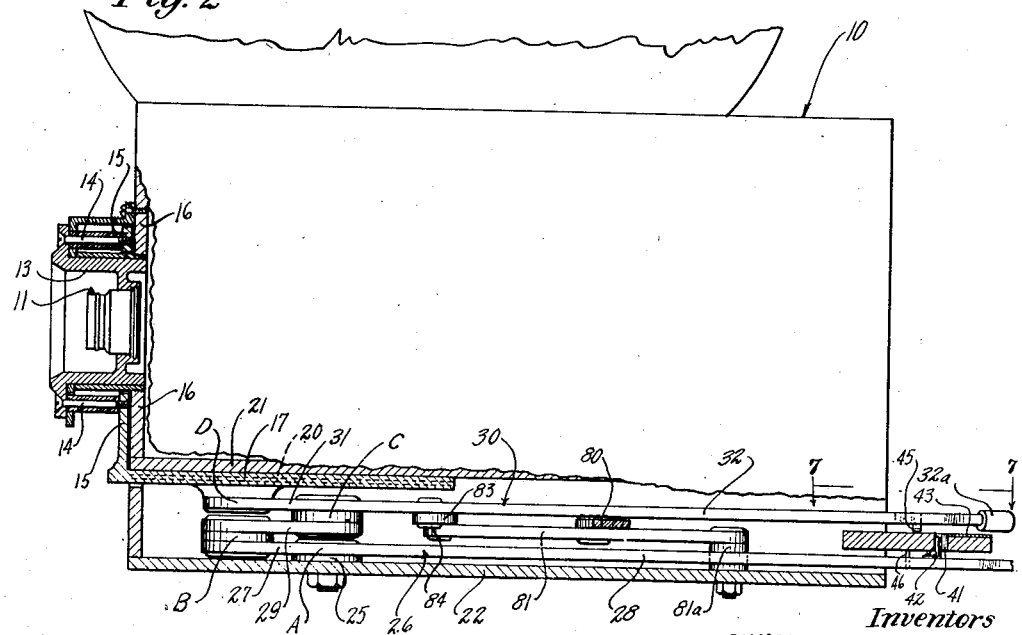
Fig. 2 is an elevation and vertical section of the camera shown in Fig. 1.

The means for shifting slider 17 and the objective lens carried thereby, between the extreme focusing positions illustrated in Figs. 2 and 2a will now be described.

Pivotally mounted at 25 to the bottom wall of the camera is a lens compensating lever 26, by means of which the focusing mechanism is set for objective lenses of various focal lengths, as hereinafter explained. Lever 26 comprises a relatively short forward arm 27 and a relatively long rearward arm 28 extending outside of the rear end of the camera, where it is provided with a handle 26a for manual actuation of the lever. Pivoted to the free end of the arm 27 is the forward end of a connecting link 29, which is of a length equal to arm 27 of lever 26. The point 25 at which lever 26 is pivoted in the frame of the camera is designated as pivot point A. The pivotal connection of link 29 with lever arm 27 is designated as pivot point B.

At a distance from pivot point B equal to the distance between pivot points B and A there is pivotally mounted upon the other end of connecting link 29 a focus setting lever 30. Lever 30 comprises a relatively short forward arm 31 equal in length to link 29 and to arm 27 of lever 26, and a relatively long rearward arm 32 extending outside of the rear end of the camera, and being there provided with a handle 32a for manual actuation of the lever. The pivotal connection of link 29 with lever 30 is designated as pivot point C. The free end of lever arm 31 is pivotally connected to the under side of slider plate 17, this pivot point being designated by the letter D, and the distance between pivot points C and D being made equal to the distance between pivot points B and C and between A and B.

It may now be seen that point A is fixed; point B is determined by the position of lever 26; point C is determined by the position of both levers 26 and 30; while point D is constrained to motion in a line parallel to the ways in which slider 17 is carried, and is determined in location along that line by the position of both levers 26 and 30.

The relations existing between the various members of the linkage may best be understood by reference to the diagrams of Figs. 12 and 13, in which the various lever arms and links are represented by single lines.

Reference is first made to Fig. 12, which corresponds to Fig. 4. The lens compensating lever 26 is in this case set for extreme movement of the objective lens as the focus setting lever is moved between its extreme positions—between the full and dotted line positions of the figures referred to. Point C is constrained to motion about pivot point B as a center, and is connected by means of lever arm 31 with point D, which point is constrained to linear motion along line $d$—$d$. Thus movement of lever 30 between the extreme focusing positions illustrated in full and dotted lines, and representing respectively the positions of close-up and infinity, causes movement of point C along arc $b$—$b$, and therefore movement of point D along line $d$—$d$. Point D, of course, is directly linked to the objective lens 11, and the movement of point D therefore represents the focusing movement of lens 11.

Lever 26 will be set in the position described in the preceding paragraph for the longest focal length lens the camera is adapted for, and the described position of the linkage provides for a maximum range of movement of the lens.

In case a lens of shorter focal length is to be used, lever 26 will be swung in a clockwise direction, as viewed in the figures, as to the position indicated in Fig. 13. In this case point B has approached quite closely to line $d$—$d$. It may now be seen that due to the new relative dispositions of the various members of the linkage, the movement of point D as lever 30 is moved between the two extreme focusing positions is greatly reduced from what it was in Fig. 12.

And when lever 26 is further moved until point B reaches the line $d$—$d$, the points B and D coincide, and lever 30 swings about point D as a stationary center. This extreme position, in which no movement whatever of lens 11 results from movement of focus setting lever 30, is illustrated in Fig. 3.

Thus by means of this linkage, any range of movement, from zero up to a maximum, may be obtained by a full swing of the focus setting lever, while the particular range necessary in any case is obtained by properly setting the lens compensating lever. The function of the lens compensating lever is thus to determine the ratio of movement of the focus setting lever to the photographic lens.

Calibrated scales are provided at the rear of the camera so that levers 26 and 30 may be accurately set for any lens and for any distance between close-up and infinity. It has been made apparent that when the focus setting lever is set to a proper position for any particular lens, the full movement of the focus setting lever will give the full range of lens focusing movement (close-up to infinity). A scale calibrated in feet is therefore provided for this movement of the focus setting lever. Also it has been shown how the lens compensating lever is set for lenses of different focal lengths to govern the amount of movement imparted thereto by the focus setting lever; and a scale calibrated in focal lengths is therefore provided for the focus setting lever. For the purpose of these scales there is provided a plate 40 extending from the rear of the camera between levers 26 and 30 (see Figs. 2, 3 and 7). Plate 40 is provided with an arcuate slot 41 through which an indicator 42 on lever 26 extends to point to a lens scale provided on plate 40. Lever 30 is provided with an indicator 45 which points to the distance scale provided on plate 40. While for some purposes the same distance scale may serve for all occasions, for the greatest accuracy in focusing and for the best results it may be desirable to provide an individual scale specifically calibrated for each individual lens that is used in the camera. Although it may be, and usually is, that the positions for closeup and infinity coincide, or substantially so, for all of such scales, there is usually some slight variance in intermediate positions. This is due to no fault of the system of the present invention, but to a lack of uniformity in even the best lenses which are now commercially available; and if the lenses of a given marked focal length and speed were to run perfectly uniform this provision would not be required. But due to this condition the distance scale is shown calibrated on a removable plate 43 screwed to plate 40. In order to hold lever 26 against displacement after once being set this lever may be provided with a pointed pin 46 (see Fig. 2) which is adapted to be taken in notches provided on the underside of plate 40. This locking means is released simply by springing lever 26 slightly downward.

The advantages of this focusing system are numerous. The focusing operation involves merely setting the lens compensating lever to the position corresponding to the lens in the camera, and then focusing the lens by means of the focus setting lever. And whether the full range of focusing movement of the particular lens in the camera is large or small, the range of movement of the lever which controls that movement remains the same and is amply large to insure the greatest accuracy in focusing under all conditions.

The means for mounting the view finder, and for automatically adjusting the view finder for parallax will now be described.

The view finder 12 is secured at its forward end upon a rotatable head 50 which is formed on the upper end of a spindle 51 turnably taken in the vertical bore of a supporting post 53, said post being provided on a bracket member 54 removably supported from the camera, as hereinafter described (see Figs. 1 and 6). Head 50 is of greater diameter than spindle 51, and the shoulders 55 thus provided bear on the upper end of post 53 for support of the finder. Bracket 54 has a connecting pin 56 removably taken within a bore 56a provided in the forward end of a mounting member 57 for support of said bracket, mounting member 57 being secured to the side of the camera, as clearly shown in Figs. 4 and 6.

The rear end of the view finder is supported by a standard 60, which standard is removably supported by mounting member 57, as hereinafter described (see Fig. 5). Standard 60 is provided at its lower end with an elongated, cylindric portion 61, disposed at right angles to the side of the camera, and having a bore 62 and a counterbore 63 drilled from the side away from the camera. Slidably fitting within bore 62 is sleeve 65 which extends and is supported within a co-axial bore 64 in member 57, as shown in Fig. 5. Bracket member 54 has a curved arm 66 extending from post 53 to sleeve 65, its end portion 67 abutting against and being fastened to mounting member 57, and having a bore 68 through which sleeve 65 extends. The inner end of cylindric portion 61 has a face 61a which contacts an opposed face 67a of the end portion 67 of bracket 64 when the view finder is in the position of Fig. 5; and which is separated therefrom when the view finder is moved outward to a position in Fig. 4. The view finder, in such movement, moves standard 60 outwardly on sleeve 65. The outer end of sleeve 65 has an enlarged head portion 62a which works in counterbore 63 during this movement.

A bolt 70 connects standard 60 with a rod 71 which extends from within the inner end of sleeve 65 through a co-axial bore in member 67 into the interior of the camera to be linked to the focusing linkage for movement of the view finder thereby, as hereinafter described in more detail. Bolt 70 includes a pin 72 having a sliding fit in the bore of sleeve 65, and having at its inner end a reduced screwthreaded portion 72a adapted for connection with a socket on the outer end of rod 71. Pin 72 has near its outer end a collar 74 adapted, when the view finder is in the position of Fig. 5, to contact the outer end of sleeve 65. Beyond collar 74 the pin has a reduced portion 75 to which is secured a knurled thumb piece 76. Between thumb piece 76 and collar 74, and surrounding reduced portion 75 is a cap 77 which is screwthreaded on the outer end of the cylindric portion 61 of standard 60. By unscrewing cap 77 from the end of member 61 and by unscrewing bolt 70 by means of thumb piece 76 with its connection with rod 71, sleeve 65 may be withdrawn from mounting member 57, and the forward end of bracket 54 with standard 60 are removable from the side of the camera; and since the forward end of bracket 54 is also removable from the camera, as has been described, the entire view finder, with its supporting bracket 54 and supporting standard 60, is quickly and easily demounted from the camera when occasion requires.

The inner end of rod 71 is pivotally connected to one end of the link 80 (see Figs. 3 and 4), the other end of which is pivoted at 82 intermediate the ends of a lever 81, which lever is pivoted at 81a to the bottom wall of the camera, as shown. The free end of lever 81 is connected by means of link 83 with the focus setting lever 30 at a point 84, which point is located a suitable distance to the rear of pivot points C. It will now be apparent that swinging the focus setting lever between the full and dotted line positions also swings members 83, 81, 80, 71 and 61 between the full and dotted line positions in Figs. 3 and 4. It will hereinafter be shown how this movement causes the view finder 12 to be moved between its full and dotted line positions in the same figures, for the purpose of parallax adjustment.

The upper end of standard 60 is provided with a horizontal plate 85 (see Figs. 5 and 11), and pivoted as by pin 86 to the inner end of plate 85 and slidable over its upper surface is a link member in the form of a plate 87 (see Figs. 5 and 10). Pivoted as by pin 88 to the outer end of plate or link 87 and slidable over its upper surface is an upper plate 89, upon which the rear end of the view finder rests and is fastened down. The plan view of plate 89 is shown in Figs. 8 and 9, in which views the overlying view finder secured thereto is removed and indicated in position in dotted lines.

The parts now being in the positions of Figs. 5, 8 and the dotted line positions of Figs. 3 and 4, when the focus setting lever 30 is moved to the full line position of Figs. 3 and 4, the linkage train 83, 81, 80 and 71 of Figs. 3 and 4 moves to the full line position of that figure. This movement is in turn transmitted through bolt 70 and standard 60 to plate 85, and finally to view finder 12, which takes the extended angular position of Fig. 9, and of the full lines in Figs. 3 and 4.

The operation of the linkage which causes this movement of the view finder is as follows:

The view finder is pivoted on bracket post 53 near its forward end to allow swinging between the positions of Figs. 8 and 9. As plate 85 is moved outward from the camera, as described in the preceding paragraph, the motion is transferred through plate 87 to plate 89; but plate 89 being fastened to the view finder must swing in an arc therewith. This it is enabled to do by virtue of the intermediate connecting link or plate 87, the forward end of which swings in an arc with the upper plate, while its rearward end pivots on plate 85 and moves therewith in a straight line away from the camera.

This movement is well illustrated in the diagrams of Figs. 12 and 14, but these diagrams will not be further considered until the means for focusing the objective lens of the finder have been described. It is to be here noted, however, that the view finder is linked for the purpose of its movement to the focus setting lever 30, which lever has a constant range of movement irrespective of the photographic lens in the camera, and hence of the compensating setting of the linkage. Thus, since the view finder is linked to a member which is constantly movable through given distances for focusing lenses of all focal lengths, the view finder is always maintained in adjustment for parallax irrespective of the lens compensating setting of the system.

Plate 89, to which the finder is attached, is provided near its center with a vertical bearing 90 supporting the central portion of a lever, generally indicated at 91. Bearing 90 extends downwardly through an aperture 92 in plate 87 and terminates at the lower surface thereof. Plate 89 is recessed at 93 and apertured at 94 to provide for the upper arm 95 of lever 91, which extends inwardly toward the camera, and is bent downwardly in aperture 94, as shown. Lever 91 includes a shaft 96 supported in bearing 90, and has on the lower end thereof a lower arm 97 extending in a direction away from the camera and adapted to work in a recess 98 provided in the face of plate 85 (see Fig. 11). The outer end of arm 97 has pivoted thereto a block 99 which is taken in a slot 99a cut in plate 85 below recess 98. Slot 99a extends in the direction of the center line x—x of plate 85, which is substantially at right angles to the camera. The end of arm 97 of lever 91 is thus held in the center line x—x of plate 85, but is free to move a limited distance along that center line; and, with that restriction, lever 91 is movable with plate 89 as plate 89 swings with relation to plate 85. Lever 91 thus swings with plate 89, pivoting about its connection with block 99, which acts as a fulcrum for the lever. Arm 97 forms one lever arm of the lever, while arms 97 and 95, which for this purpose may be considered together, form a second and longer lever arm 95, 97 of the lever. To the free end of arm 95 is pivotally connected a focusing link 101, which extends through an aperture 102 in the side of plate 89. Link 101 lies just below the finder body, and extends to the forward end thereof, where it has operative connection with the finder lens 103, as shown in Fig. 1. The head 50 of the forward finder-mounting is provided with a slot 104 through which link 101 passes.

The arms of lever 91 are disposed as indicated in Fig. 8, so that when the parts are in the position of that figure the lever arm 95 is drawn toward the rear side of the aperture 94 in which it works, and the link 101 and the finder lens 103 are correspondingly drawn to their rearward positions. When the camera is focused on a "close-up" object, the focusing linkage swings the finder to point directly at the object, as previously explained, which brings the system to a position illustrated by Fig. 9. To reach this position, the shaft 96 of lever 91 has been moved with plate 89 out of the center line of the lower plate 85, the lever pivoting about block 99 retained in plate 85 as a fulcrum. This movement causes the end of lever arm 95 to be moved forwardly in its aperture 94, or in other words with respect to the finder, which in turn gives forward movement to link 101 and thereby to finder lens 103.

These described movements of the finder and finder lens will readily be understood from references to the diagrams of Figs. 12 and 14. The diagram of Fig. 12, previously referred to, shows the focusing linkage, the linkage for transmitting motion to the view finder and the linkage for focusing the finder lens, in full lines for the close-up position; but shows only the focusing linkage and a portion of the linkage for transmitting motion to the view finder in dotted lines for the infinity position. In order to avoid confusion the dotted line positions of the finder and finder lens are not shown in Fig. 12, but are shown in full lines in Fig. 14, it being understood that the full line diagram of Fig. 14 connects with the dotted line diagram of Fig. 12. In the diagram of Fig. 13 the finder has been omitted since its operation for the case therein illustrated is identical with its operation illustrated in Figs. 12 and 14.

In Figure 12 the full line position is the position for close-up shots, and the dotted line position is for relatively long distance shots. It will be noted that the letter D, which is representative of the position of the objective lens of the camera, is in an extreme forward position for close-up shots, and in an extreme rearward position for distance shots. The dotted line position of Figure 12, taken with Figure 14, which is thus the "distance" position of the system, will be considered first.

The axis Y—Y represents the center line of the finder when the finder is swung in toward the camera to its "infinity" position, as in Figure 8. In Figure 14 the view finder is represented by the single line 12, which is seen to coincide in position with axis Y—Y. The plate or link upon which the finder is mounted is represented by line 89, which is shown pivoted at 88 to plate or link 87, link 87 being in turn pivoted at 86 to plate 85. Plate 85 is constrained to motion in a straight line substantially at right angles to axis Y—Y and is moved therein through the medium of link 71.

The system being in the position described in the preceding paragraph, to focus the camera upon a close-up object, the system is shifted by means of lever 30 to the full line position of Figure 12, for instance. This movement shifts links 80 and 71 upwardly, as viewed in the figure, and shifts the pivotal connection 86 of plate 85 with link 87 upwardly from the position of Figure 14 to the position of Figure 12. Link 87 being pivoted at its other end at 88 to plate 89, which plate may be considered a part of the finder 12, then transmits motion to the finder, swinging the rearward end thereof outwardly about 51 as a pivot, while link 87 swings to the left as indicated.

Lever 91 is indicated in the diagrams pivoted at 96 to plate 89, its fulcrum 99 being constrained to linear motion with plate 85, and the free end of its arm 95 being linked by means of member 101 with the finder lens 103. When the linkage is shifted from the position of Figure 14 to that of Figure 12, point 96 is carried away from link 85, while its fulcrum 99 is held in line with link 85. This movement causes the outer end of arm 95 to be swung forward with respect to the finder, and accordingly shifts the finder lens forwardly therein through the distance indicated at $r$.

It is evident that by properly proportioning the various members of the system, the view finder will always be in automatic adjustment for parallax, and its lens and the camera lens will always be focused at the same distance.

It is to be noted that in the case of the focusing of the finder lens, as well as in shifting the finder for parallax adjustment, the movement referred to is obtained from a member of the focusing linkage of the camera which is constantly movable through a given range during focusing of the camera lens, irrespective of the focal length and hence of the necessary movement which must be imparted to that camera lens.

It will be recognized that the illustrative system specifically described herein is capable of considerable modification and rearrangement without departing from the spirit and scope of our invention; and it is therefore to be understood that the following claims embrace all such modifications and equivalent arrangements as may fairly be construed to fall within the scope of our invention.

We claim:

1. In a camera, the combination of an objective lens removably mounted in the camera, means for moving the objective lens along its axis, said means including a focus setting lever linked to said lens for movement thereof, and an adjustable lever-constraining link pivoted to the lever for support thereof, and adapted by adjustment to vary the amount of movement imparted by said lever to said lens.

2. In a camera, the combination of an objective lens removably mounted in the camera, means for moving the objective lens along its axis, said means including a focus setting lever linked to said lens for movement thereof, a link pivoted at one end to the lever, and pivotally mounted at the other end at a point movable with relation to the camera, and means for adjusting the position of the pivotal mounting of the link with relation to the camera.

3. In a camera, the combination of an objective lens removably mounted in the camera, means for moving the objective lens along its axis, said means including a focus setting lever linked at one end to said lens for movement thereof, a link pivoted at one end to the lever at a point intermediate the ends thereof, and pivotally mounted at the other end at a point movable with relation to the camera, and means for adjusting the position with the pivotal mounting of the link with relation to the camera.

4. In a camera, the combination of an objective lens removably mounted in the camera, means for moving the objective lens along its axis, said means including a focus setting lever linked at one end to said lens for movement thereof, a link pivoted at one end to the lever at a point intermediate the ends thereof, and a supporting member movably mounted within the camera and pivotally supporting the other end of said link.

5. In a camera, the combination of an objective lens removably mounted in the camera, means for moving the objective lens along its axis, said means including a focus setting lever linked at one end to said lens for movement thereof, a link pivoted at one end to the lever at a point intermediate the ends thereof, and a manually actuated lever pivotally mounted intermediate its ends within the camera, and pivotally supporting the other end of said link with one of its free movable ends.

6. In a camera, the combination of a lens mounting adapted to take lenses of various focal lengths, a focusing member constantly movable through a fixed range of movement for full focusing movement of lenses of all focal lengths, compensating means to vary the ratio of movement between the focusing member and the lens mounting so as to compensate for lenses of differing focal lengths when the focusing lever is moved through its fixed range of movement, a view finder movably mounted in association with the camera, and means linking said constantly movable focusing member with said view finder whereby the operation of focusing the photographic lens moves the finder to adjust for parallax.

7. In a camera, the combination of means for mounting a photographic lens, means for focusing said lens, said means including a member movable through a constant determined distance for moving the lens through its full focusing range, a view finder movably mounted in association with the camera, and means linking said movable member of said focusing means with the view finder whereby the operation of focusing the photographic lens automatically moves the finder to adjust for parallax.

8. In a camera, the combination of means for mounting a photographic lens, means for focusing said lens, said focusing means comprising a linkage including a manually actuated focusing member linked to said lens, and means for varying the ratio of movement of the focusing member to the lens, said linkage also including a member constantly movable through a determined range irrespective of the setting of said last mentioned means, a view finder movably mounted in association with the camera, and means linking said constantly movable member of said focusing means with the view finder whereby the operation of focusing the photographic lens automatically moves the finder to adjust for parallax.

9. In a camera, the combination of means for mounting a photographic lens, means for focusing said lens, said focusing means including a manually actuated focusing member movable through a determined distance for moving the lens through its full focusing range, means for varying the ratio of movement of said manually actuated focusing member with respect to said lens, whereby the full determined movement of the manual member may be caused to move photographic lenses of varying focal lengths through their respective full focusing ranges, a view finder movably mounted in association with the camera, and means linking said manually actuated focusing member with said finder whereby the operation of focusing the photographic lens automatically moves the finder to adjust for parallax.

10. In a camera, the combination of means for mounting a photographic lens, means for focusing said lens, said focusing means including a member movable through a determined distance as the lens is moved through its full focusing range, a view finder associated with the camera, a pivotal mounting for one end of said finder extending from the camera, a supporting member for the other end of the finder supported from the camera and movable substantially at right angles thereto, means linking said supporting member with said movable member of said focusing means, and a link pivotally connected at one end to the free end of the finder, and at the other end to the movable supporting member therefor, whereby the operation of focusing the photographic lens causes movement of the linkage connected to the finder to maintain the finder in constant adjustment for parallax.

11. In a camera, the combination of means for mounting a photographic lens, means for focusing the photographic lens, a view finder mounted in association with the camera, an objective lens movably mounted on said view finder, and means actuated by virtue of focusing the photographic lens of the camera for adjusting the position of the view finder for parallax and for focusing the objective lens of the view finder.

12. In a camera, the combination of means for mounting a photographic lens, means for focusing the photographic lens, a view finder mounted in association with the camera, an objective lens movably mounted on said view finder, means actuated by virtue of focusing the photographic lens of the camera for adjusting the position of the view finder for parallax, and means actuated as the position of the view finder is adjusted for parallax for focusing the objective lens thereof.

13. In a camera, the combination of means for mounting a photographic lens, means for focusing said lens, said focusing means including a member movable through a determined distance as the lens is moved through its full focusing range, a view finder associated with the camera, an objective lens adjustably mounted therein, a pivotal mounting for one end of said finder extending from the camera, a supporting member for the other end of the finder supported from the camera and movable substantially at right angles thereto, means linking said supporting member with said movable member of said focusing means, and means connecting the free end of the finder with the supporting member therefor, whereby the operation of focusing the photographic camera lens causes movement of the linkage connected to the finder and thereby swings the finder to maintain it in constant adjustment for parallax, a member fulcrumed on said movable finder-supporting member and pivotally connected with said finder, and means linking a point on said member movable about the fulcrum thereof to said finder lens, whereby swinging of the finder during parallax adjustment causes movement of the fulcrumed member relative to the finder and thereby movement of the finder lens.

14. In a camera, the combination of means for mounting a photographic lens, means for focusing said lens, said focusing means including a member movable through a determined distance as the lens is moved through its full focusing range, a view finder associated with the camera, an objective lens adjustable mounted therein, a pivotal mounting for one end of said finder extending from the camera, a supporting member for the other end of the finder supported from the camera and movable substantially at right angles thereto, means linking said supporting member with said movable member of said focusing means, and means connecting the free end of the finder with the supporting member therefor, whereby the operation of focusing the photographic camera lens causes movement of the linkage connected to the finder and thereby swings the finder to maintain it in constant adjustment for parallax, a lever fulcrumed on said movable finder-supporting member, a pivotal connection between the lever and the finder, and means linking the lever to the finder lens, whereby swinging of the finder during parallax adjustment causes movement of the lever relative to the finder and thereby movement of the finder lens.

15. In a camera, the combination of means for removably mounting a photographic lens, means for focusing the photographic lens, said focusing means including a member constantly movable through a fixed range for lens of all focal lengths, compensating means to vary the ratio of movement between said constantly movable focusing member and the photographic lens, a view finder movably mounted in association with the camera, means linking said constantly movable member of said focusing means with said view finder whereby operation of the focusing means moves the view finder to adjust for parallax, an objective lens movably mounted in the view finder, and means linking said finder lens with the constantly movable member of the focusing means whereby operation thereof focuses both the camera lens and the finder lens.

In witness that we claim the foregoing we have hereunto subscribed our names this 24th day of October, 1929.

WILLIAM F. RUDOLPH.
HARRY G. CUNNINGHAM.
JOHN ROY HUNT.

CERTIFICATE OF CORRECTION.

Patent No. 1,856,432.                                                    May 3, 1932.

WILLIAM F. RUDOLPH ET AL.

It is hereby certified that error appears in the printed specification of the above numbered patent requiring correction as follows: Page 6, line 105, claim 3, for "with" read of; and that the said Letters Patent should be read with this correction therein that the same may conform to the record of the case in the Patent Office.

Signed and sealed this 4th day of October, A. D. 1932.

M. J. Moore, (Seal)                                                Acting Commissioner of Patents.